United States Patent

[11] 3,578,860

[72] Inventors Jacob Louis Breitbord
Framingham;
Richard Donald MacDougall, Arlington, Mass.
[21] Appl. No. 710,296
[22] Filed Mar. 4, 1968
[45] Patented May 18, 1971
[73] Assignee Itek Corporation
Lexington, Mass.

[54] APPARATUS FOR CONTINUOUS DODGING PRINTING
25 Claims, 1 Drawing Fig.
[52] U.S. Cl. ............................................... 355/80, 96/27, 355/110, 355/111
[51] Int. Cl. ......................................... G03b 27/76
[50] Field of Search ............................. 355/80, 108, 110, 111; 96/27

[56] References Cited
UNITED STATES PATENTS
3,166,998  1/1965  Watson ..................... 355/80

Primary Examiner—John M. Horan
Assistant Examiner—Richard L. Moses
Attorneys—Homer O. Blair, Robert L. Nathans, Lester S. Grodberg and Joseph S. Iandiorio ABSTRACT: Apparatus is disclosed for continuously dodging a series of photographic reproductions as they are being printed, including an ultraviolet light source for producing a narrow zone of ultraviolet energy to excite a fluorescent surface on the internal wall of a transparent cylinder to emit actinic light, drive means for rotating the cylinder relative to the narrow zone of ultraviolet energy to sweep that zone, which extends transverse to the direction of rotation of the cylinder, along the fluorescent surface to successively excite narrow portions of that surface, and a near infrared light source fixed relative to the ultraviolet light source for directing near infrared light through a transparency onto excited narrow portions of the surface to quench the surface to form a luminous image, unquenched actinic light from the surface being simultaneously directed to a photosensitive medium to expose narrow sections of that medium, and second drive means for moving the transparency and photosensitive medium relative to the narrow zone of energy, for continuously subjecting unexposed sections of the photosensitive medium and companion segments of the transparency to such exposure.

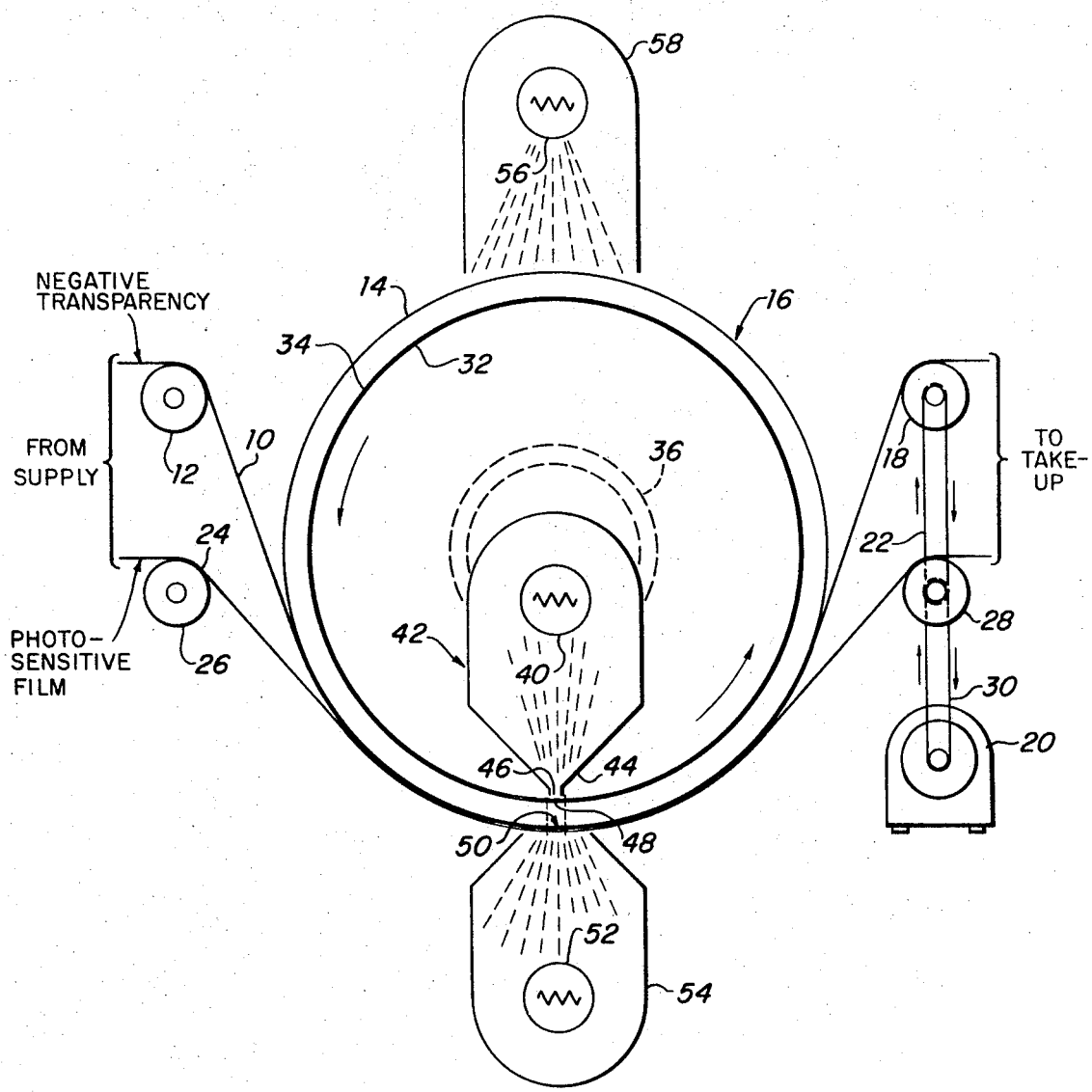

APPARATUS FOR CONTINUOUS DODGING PRINTING

CHARACTERIZATION OF INVENTION

The invention is characterized in apparatus for continuously dodging a series of photographic reproductions as they are being printed comprising an image-bearing transparency, print material optically coacting with the transparency, an illumination device for producing and sequentially directing at sequential portions of the transparency actinic light, quenchable upon the application of quenching energy thereto, means for sequentially passing the quenching energy through portions of the transparency to corresponding portions of the illumination device to sequentially quench portions thereof.

BACKGROUND OF INVENTION

This invention relates to dodging printing and more particularly to a method and apparatus for continuously dodging a series of photographic reproductions as they are being printed.

Dodging is a process in which the density levels of the original film transparency are effectively compressed into the range of sensitivity of the emulsion on the photosensitive medium which is exposed through the transparency to produce a photographic print or reproduction. Typically, the transparency is an original negative and dodging may be accomplished by inserting a positive mask of the original negative between the exposing light source and the original negative. The positive mask attenuates the light directed toward the less dense areas of the original negative to a greater degree than it attenuates the light directed toward the more dense areas of the original negative. The result is a print having greater clarity of detail because the exposure levels are within the most sensitive and substantially linear portion of the sensitivity curve of the emulsion of the photosensitive medium.

Dodging may also be accomplished by using a phosphor quenching technique in which ultra-violet light is used to excite a fluorescent surface to produce actinic light to expose a photosensitive medium. A source of near infrared light directed through the negative quenches the surface and attenuates the actinic light output of the surface in inverse proportion to the density of the negative: areas of the surface shielded from the near infrared light by high density portions of the negative receive less quenching near infrared light and produce more actinic light while areas of the surface shielded by low density portions of the negative receive more quenching near infrared light and produce less actinic light.

A shortcoming of this technique is that it is slow. Each set of a negative and photosensitive medium must be individually prepared, exposed, and removed. And more importantly, the fluorescent surface must be brought back to a neutral state in preparation for each successive set to be printed. Such a neutral state may be produced by a total quench or by allotting time for the fluorescence to decay. Thus, even if a suitable, fast feeding arrangement were applied to this technique, the inherent delay while the surface returned to its neutral state would still be present.

SUMMARY OF INVENTION

It is desirable therefore to have means and methods for continuously dodging a series of photographic reproductions as they are being printed.

It is also desirable to provide such a means and method employing a phosphor-quenching technique of dodging.

It is also desirable to provide such a means and method capable of very high production rates.

The invention may be accomplished by using a narrow zone of energy produced by excitation means to excite a fluorescent surface to produce actinic light, driving the excitation means and fluorescent surface relative to each other to sweep the narrow zone of energy, which zone extends transverse to the direction of relative motion between the fluorescent surface and the excitation means, along the fluorescent surface to successively excite narrow portions of the surface, applying energy from a source of near infrared light which is fixed relative to the excitation means through a transparency onto excited narrow portions of the surface to quench the surface to form a luminous image, unquenched actinic light from the fluorescent surface being simultaneously directed to a photosensitive medium to expose narrow sections of that medium, and moving the transparency and medium and narrow zone of energy relative to each other for continuously subjecting unexposed sections of the medium and companion sections of the transparency to such exposure.

DISCLOSURE OF A SPECIFIC EMBODIMENT

Other objects, features, and advantages will appear from the following description of a preferred embodiment of the invention taken with the attached drawing showing a rotatable transparent cylinder whose internal surface, coated with a fluorescent material, is excited by ultraviolet light and selectively quenched by a source of near infrared light through a negative and a photosensitive medium.

An essential feature of the invention as demonstrated by the embodiment in the drawing is that it provides a source of light to be swept across a negative and a photosensitive medium to continuously expose the medium, while the source of light, which is a narrow portion of a fluorescent surface, is constantly being replaced by successive portions of the fluorescent which expose successive sections of the photosensitive medium, so that each narrow portion of the fluorescent surface has a period to dissipate or erase the particular light pattern or luminous image imposed on it, by a quenching light passing through the negative, and to return to its normal or neutral state before it is again excited to produce light to expose another section of the negative.

In the drawing a negative 10 is drawn over roller 12 about a portion of the exterior wall 14 of transparent cylinder 16 by drive roller 18 driven by motor 20 through belt 22. A photosensitive film 24 is drawn over roller 26 about a portion of the wall 14 of cylinder 16, in overlying relationship with negative 10, by drive roller 28 driven by motor 20 through belt 30.

Cylinder 16 has a layer of fluorescent material 32 disposed on its interior wall 34 and is rotatable about its axis by a motor 36. It may also be rotated by motor 20 or by frictional contact with negative 10 as it is driven by drive roller 18.

Within cylinder 16 is stationarily mounted an excitation source for exciting fluorescent material 32. The preferable excitation source, an ultraviolet lamp 40 in housing 42 provided with baffles 44 to shape the energy from lamp 40 into a narrow zone of energy 46 and aligned transverse to the direction of rotation of cylinder 16, excites a narrow portion 48 of fluorescent material 32, similarly transverse to the direction of rotation of cylinder 16, to produce actinic light to expose a correspondingly narrow section 50 of film 24 and negative 10.

The light emanating from portion 48 is quenched through negative 10 and photosensitive film 24 by an infrared amp 52 in housing 54, which lamp 52 preferably provides quenching energy in the near infrared region, i.e. radiations having wavelengths of approximately 0.8 to 2.0 microns. This results in those areas of portion 48 in line with high density areas of negative 10 being slightly quenched and those areas of portion 48 in line with low density areas of negative 10 being more highly quenched. The luminous image or light pattern produced by portion 48 is thus complementary to the density distribution of negative 10.

A second near infrared source may be provided, utilizing infrared lamp 56 in housing 58, to totally quench, i.e. erase the luminous image on, previously excited portions of material 32 as the portions are rotated away from zone 46 during the period of a revolution of cylinder 16, during which period the fluorescence of the portions could decay and the luminous images disappear naturally. Lamp 56 hastens the decay so that the portions are erased in a shorter time and cylinder 16, thus the entire process, can be operated at high speed. Presently, this embodiment may be operated at film speeds of 120 feet per minute. With larger diameter cylinders or less retentive fluorescent materials, the process could be conducted at even higher speeds. Of course the function of lamp 56 in housing 58 could be performed as well by extending the area irradiated by lamp 52, thereby obviating the need for a second infrared source.

Various equivalent structural configurations are possible for performing the invention. The ultraviolet lamp 40 and housing 42 may be arranged external to cylinder 16, and infrared lamp 52 and housing 54 may be placed within cylinder 16. Negative 10 and film 24 may be stationary and the infrared and ultraviolet light sources may be moved. For example, long strips of film and negative may be wrapped around the cylinder and printed in one revolution of the cylinder. For another example a planar fluorescent surface may be disposed between a pair of spaced rollers which drive a conveyor belt whose path encloses the planar surface. The planar surface is positioned generally parallel to the plane containing the axes of the two rollers which is parallel to the forward and return paths of the conveyor belt extending between the rollers. The planar fluorescent surface may be excited to produce actinic light over its entire surface. A slit in the moving conveyor belt may be used as a moving shutter to sweep light from sequential portions of the fluorescent surface over sequential portions of the transparency and print material which may be stationary or moving. And quenching energy may be directed at the moving slit through the transparency and print material to quench the fluorescent surface according to the image on the transparency. Members of various geometric shapes may be used in place of cylinder 16: an endless belt may be used; or a planar surface may be used with an arrangement for a recycling period initiated when the excited portion of the fluorescent surface is at a terminal part of the surface. Other than ultraviolet and infrared energy sources may be used to produce and quench the light source.

The arrangement of film 24 and negative 10 relative to the fluorescent material and the infrared source may be varied as well. Negative 10 could be placed between film 24 and infrared lamp 52 in which case the print would be a negative of the negative. The transparency is not restricted to negatives: it may as well be positives or any other type of transparency.

Other embodiments will occur to those skilled in the art and are within the following claims:

We claim:
1. Apparatus for continuously dodging photographic reproductions as they are being printed comprising:
 a. an image bearing transparency;
 b. print material optically coacting with said transparency;
 c. an actinic light source which is quenchable upon the application of quenching energy thereto;
 d. means for sequentially directing light from successive portions of said actinic light source to successive portions of said image bearing transparency and said print material, and including a drive system for causing successive portions of said image bearing transparency and said print material to be exposed by successive portions of said actinic light source; and
 e. means, including a source of quenching energy, for passing quenching energy through successive portions of said transparency to corresponding portions of said actinic light source to selectively quench portions thereof.

2. The apparatus of claim 1 in which:
said source of actinic light includes excitation means for producing a narrow zone of energy for exciting a fluorescent material to produce actinic light, and a fluorescent surface excitable by said excitation means;
said means for sequentially directing light from successive portions of said source of actinic light includes first drive means for moving said excitation means and said fluorescent surface relative to each other to sweep said narrow zone of energy along said fluorescent surface, to successively excite narrow portions of said surface, said narrow zone extending transverse to the direction of relative motion of said fluorescent surface and said excitation means;
said source of quenching energy includes an infrared light source for directing infrared light through said transparency onto said excited narrow portions of said surface to selectively quench said surface to form a luminous image, unquenched actinic light from said fluorescent surface being simultaneously directed to said print material to expose narrow sections of said material; and,
said drive system includes second drive means for moving said transparency and material and said narrow zone of energy relative to each other for continuously, successively subjecting unexposed sections of said material and companion segments of said transparency to such exposure.

3. The apparatus of claim 2 in which said first drive means moves said fluorescent surface relative to said excitation means and infrared source.

4. The apparatus of claim 2 in which said fluorescent surface is in the form of a cylinder.

5. The apparatus of claim 4 in which said excitation means is within said cylindrical surface and said infrared source is external to it.

6. The apparatus of claim 2 in which said excitation means is an ultraviolet light source.

7. The apparatus of claim 2 in which said fluorescent surface is located on the inner wall of a transparent cylindrical member.

8. The apparatus of claim 2 in which said second drive means moves said transparency and pring material relative to said narrow zone of energy.

9. The apparatus of claim 7 in which said excitation means is within said cylindrical member and said infrared source is external to it.

10. The apparatus of claim 9 in which said cylindrical member is rotatable by said first drive means relative to said narrow zone of energy.

11. The apparatus of claim 10 in which said second drive means moves said transparency and print material relative to said narrow zone of energy.

12. The apparatus of claim 11 in which said second drive means moves said transparency and print material generally tangentially to said cylindrical member at the area of said surface proximate said narrow zone of energy and at approximately the translational speed of the periphery of said member.

13. The apparatus of claim 2 in which said print material is between said transparency and said infrared source.

14. The apparatus of claim 2 in which said transparency is a photographic negative.

15. The apparatus of claim 2 further including a second infrared light source spaced from the first said infrared light source for completely quenching said narrow portions of said fluorescent surface after said narrow portions have exposed said narrow sections of said print material.

16. Apparatus for continuously dodging a series of photographic reproductions as they are being printed comprising:
 an image bearing transparency;
 print material optically coacting with said transparency;
 excitation means for producing a narrow zone of energy for exciting a fluorescent material to produce actinic light;
 a fluorescent surface excitable by said excitation means;
 first drive means for moving said excitation means and said fluorescent surface relative to each other to sweep said narrow zone of energy along said fluorescent surface, to successively excite narrow portions of said surface, said narrow zone extending transverse to the direction of relative motion of said fluorescent surface and said excitation means;
 an infrared light source for directing infrared light through said transparency onto said excited narrow portions of said surface to selectively quench said surface to form a luminous image, unquenched actinic light from said fluorescent surface being simultaneously directed to said print material to expose narrow sections of said material; and, second drive means for moving said transparency and said print material and said narrow zone of energy relative to each other for continuously, successively subjecting unexposed sections of said material and companion segments of said transparency to such exposure.

17. The apparatus of claim 16 in which said first drive means moves said fluorescent surface relative to said excitation means and infrared source.

18. The apparatus of claim 17 in which said second drive means moves said transparency and medium relative to said narrow zone of energy.

19. The apparatus of claim 18 in which said fluorescent surface is formed on the inner wall of a cylindrical member which is rotatable with said surface by said first drive means.

20. The apparatus of claim 19 in which said excitation means is within said cylindrical member and said infrared source is external to it.

21. The apparatus of claim 20 in which said second drive means moves said transparency and medium generally tangentially to said cylindrical member at the area of said surface proximate said narrow zone of energy and at approximately the translational speed of the periphery of said member.

22. The apparatus of claim 21 further including a second infrared light source spaced from the first said infrared light source for completely quenching said narrow portions of said fluorescent surface after said portions have exposed said narrow sections of said photosensitive medium.

23. The apparatus of claim 22 in which said transparency is a photographic negative.

24. The apparatus of claim 23 in which said transparency is between said fluorescent surface and said photosensitive medium.

25. The apparatus of claim 24 in which said excitation means is an ultraviolet light source.